United States Patent [19]

Schneider et al.

[11] Patent Number: 5,735,380
[45] Date of Patent: Apr. 7, 1998

[54] SUSPENDED STORAGE APPARATUS

[75] Inventors: Hauke Schneider, Lottstetten, Germany; Armin Hofmann, Bussigny, Switzerland

[73] Assignee: Sapal Societe Anonyme des Plieuses Automatique, Ecublens, Sweden

[21] Appl. No.: 571,876

[22] PCT Filed: May 2, 1995

[86] PCT No.: PCT/CH95/00098

§ 371 Date: Feb. 9, 1996

§ 102(e) Date: Feb. 9, 1996

[87] PCT Pub. No.: WO95/29863

PCT Pub. Date: Nov. 9, 1995

[30] Foreign Application Priority Data

May 3, 1994 [FR] France ................... 94 05778

[51] Int. Cl.⁶ ........................................ B65G 1/00
[52] U.S. Cl. .................. 198/347.1; 198/594; 198/435
[58] Field of Search .................. 19/347.1, 347.3, 19/435, 468.6, 594

[56] References Cited

U.S. PATENT DOCUMENTS

| | | | |
|---|---|---|---|
| 2,932,376 | 4/1960 | Millington | 198/594 X |
| 3,068,987 | 12/1962 | Franklin | 198/435 X |
| 4,117,921 | 10/1978 | Mikata. | |
| 4,634,333 | 1/1987 | Butterly, Jr. et al. | 198/435 X |
| 4,964,498 | 10/1990 | Klingl | 198/347.1 |

FOREIGN PATENT DOCUMENTS

| | | |
|---|---|---|
| 0534902 | 9/1992 | European Pat. Off. . |
| 0538742 | 10/1992 | European Pat. Off. . |
| 0569788 | 4/1993 | European Pat. Off. . |
| 552677 | 1/1923 | France . |
| 32 38 888 | 4/1984 | Germany . |
| 5-85619 | 4/1993 | Japan ............... 198/347.1 |
| 2159787 | 12/1985 | United Kingdom ........ 198/347.1 |

*Primary Examiner*—James R. Bidwell
*Attorney, Agent, or Firm*—Davis and Bujold

[57] ABSTRACT

A suspended storage apparatus in which products (16) are placed in trays (14) supporting shelves (15) for carrying the products. The receiving station of the apparatus comprises an assembly consisting of a pushing device connected to a first drive mechanism (101A), the pushing device including at least one substantially horizontally movable pushing member (107) for transferring products from the shelves to a conveyor belt (108), and a second drive mechanism (101B) for moving the pushing member substantially vertically as it moves horizontally. This combination of two directions of motion enables continuous discharge of the products.

6 Claims, 4 Drawing Sheets

SUSPENDED STORAGE APPARATUS

The present invention concerns a pendulant product storage installation, in particular for food products, and more particularly for bars of chocolate or the like, these products being placed on shelves arranged horizontally on pendulant product carriers horizontally suspended on two chains moving parallel to each other in a closed circuit comprising a feed section going from a station for loading the products on the shelves, to a product receiving station arranged for unloading the shelves, and a return section in which the shelves are brought back empty from the receiving station to the loading station, in which the receiving station comprises equipment consisting of a pusher device associated with a first driving mechanism, the pusher device comprising at least one pusher moving substantially horizontally.

BACKGROUND OF THE INVENTION

Numerous pendulant storage installations are already known, in particular that disclosed in the European Patent application published under number 0 538 742 A1. In food product production lines, for example bars of chocolate, biscuits, chocolate covered products and other products which are fragile and delicate to handle, it is often necessary to be able to have a temporary storage installation available for these products, given that production is carried out continuously while packaging is carried out in batches and the packaging units of a same line are periodically subject to halts required for maintenance, repair or the placing of packing material.

Furthermore, European Patent No. A-0 569 788 discloses a device for receiving products at the discharge end of a conveyor belt, comprising a horizontal movement pusher which cooperates with a belt one end of which can be moved between different levels to clear products at different heights. In the case of the device disclosed in Patent EP-A-0 569 788, the effect of interposing a conveyor belt between the pusher and a receiving station is to lengthen the storage unit and to reduce its operational speed.

These storage installations must comply with relatively burdensome specifications. They must allow large storage capacity and assure efficient and careful transport of the products from a loading station to a receiving station, while providing maximum security for the conveyed products, great flexibility of use and variable storage potential as a function of the instant demand.

Among the problems encountered with these installations is that of placing and recovering products on the shelves carried by the pendulant product carriers. These operations must be rapid and accurate and the equipment used must be adapted to the products to be transferred. In addition, the placing and recovery operations must be able to be carried out continuously or in batches. In the first case, the chains which convey the pendulant product carriers rotate continuously and the loading station and receiving station equipment must be arranged for following their movement. In the second case, this equipment is stationary.

SUMMARY OF THE INVENTION

The present invention proposes to answer all of these demands by providing a pendulant storage installation which is flexible to use and which has a great ability to be adapted as a function of the different applications for which it is intended.

This object is achieved by the installation according to the invention, which is characterised in that said equipment comprises a second driving mechanism arranged for imposing on said pusher a substantially vertical movement which combines with said substantially horizontal movement.

According to a preferred embodiment, said first mechanism comprises a control cam connected to said pusher to perform said substantially horizontal movement and said second mechanism comprises at least one hydraulic or pneumatic jack or a screw having an axial movement connected to said pusher to perform said substantially vertical movement.

According to an alternative embodiment, the first mechanism may comprise a first control cam connected to said pusher to perform said substantially horizontal movement and said second mechanism may comprise a second control cam connected to said pusher to perform said substantially vertical movement.

Preferably, said pusher is carried by a slide arranged for moving horizontally on a first guiding member and for moving vertically on a second guiding member.

In an advantageous manner, the installation comprises at least two autonomous coupling keys arranged for coupling separately or simultaneously a central actuator with either one of two lateral actuators respectively carrying the pushers.

In all embodiments of the equipment, the pushers are arranged for clearing products placed on separate shelves carried by the pendulant product carriers.

In the preferred embodiment of the installation according to the invention, a conveyor belt of said receiving station arranged for clearing products, is associated with a vertical movement mechanism.

In an alternative embodiment, the receiving station comprises at least two transversal conveyor belts arranged for simultaneously clearing two products carried by a pendulant product carrier.

BRIEF DESCRIPTION OF THE DRAWINGS

The present invention will be better understood with reference to the description of preferred embodiment examples and the attached drawings in which.

DESCRIPTION OF THE PREFERRED EMBODIMENTS

Figure 1:
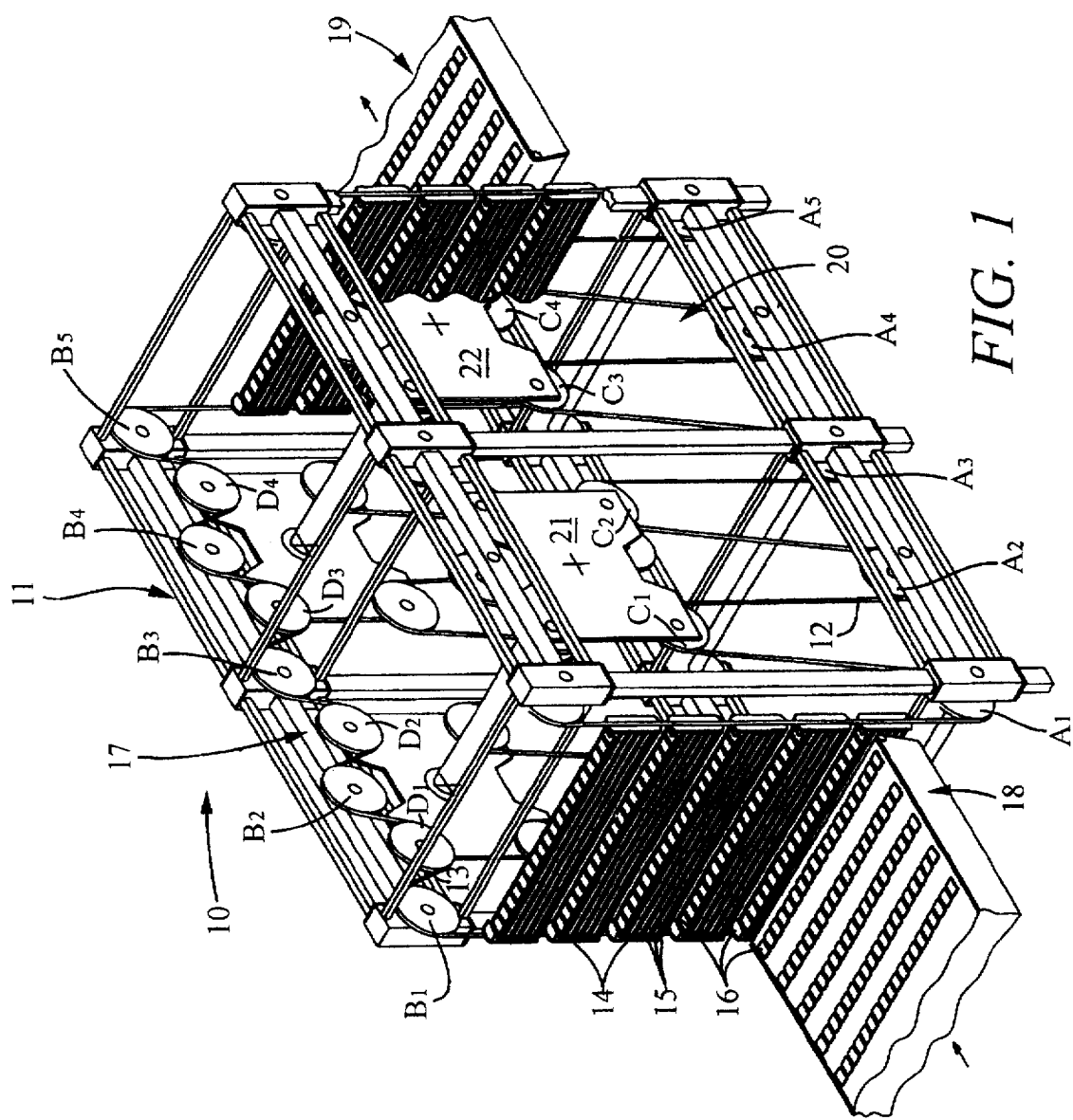
FIG. 1 is a schematic perspective view of an installation according to the invention.

Referring to FIG. 1, the pendulant storage installation 10, shown in perspective, consists principally of a frame 11 which, in this case, has the shape of a parallelepipedic rectangle which defines a storage space inside which are mounted two endless conveying chains 12 and 13 between which pendulant product carriers 14 are suspended carrying shelves 15 on which products 16 are placed. Pendulant product carriers 14 are suspended horizontally by two lateral pivots on chains 12 and 13 which move parallel to each other along a multiple loop path comprising a first section called the feed section 17 going from a station 18 for loading the products onto the shelves to a receiving station 19, arranged for unloading said shelves, and a second section 20 called the return section in which the previously unloaded shelves return from the receiving station to the loading station. In the example shown, the installation comprises five pairs of lower sprocket wheels, A1, A2, A3, A4, A5 respectively, and five pairs of upper sprocket wheels, B1, B2, B3, B4, B5 respectively, which are mounted on fixed shafts carried by the frame. Furthermore, the installation comprises, in the example shown, two vertically mobile carriages 21 and 22 respectively, which each carry two pairs of lower sprocket wheels C1, C2 (for carriage 21) and C3, C4 (for carriage 22) and two pairs of upper sprocket wheels D1, D2 (for carriage 21) and D3, D4 (for carriage 22). The feed section of the closed circuit defined by the two chains 12 and 13 consists of chain segments passing from the loading station immediately below sprocket wheels B1, then above these sprocket wheels, below upper sprocket wheels D1 of carriage 21, above sprocket wheels B2, below upper sprocket wheels D2 of carriage 21, then above sprocket wheels B3, below upper sprocket wheels D3 of carriage 22, above sprocket wheels B4, below upper sprocket wheels D4 of carriage 22, and above sprocket wheels B5 in order to descend again vertically to the receiving station. The return section is defined by the sections of chain going from the return station below sprocket wheels A5, then above lower sprocket wheels C4 of carriage 22, below sprocket wheels A4, above lower sprocket wheels C3 of carriage 22, below sprocket wheels A3, above lower sprocket wheels C2 carriage 21, below sprocket wheels A2, above lower sprocket wheels C1 of carriage 21, and finally below sprocket wheels A1 to return straight down to the loading station. As a result of the mobile carriages, the storage installation has a variable accumulation or storage capacity. When the carriages are in a high position, the feed section is minimal, that is to say that the products are conveyed as quickly as possible from the loading station to the receiving station. On the other hand, when the carriages descend to a low position, the length of the feed section increases as does the installation storage capacity.

In the embodiment according to the invention, frame 11 is designed in accordance with a modular principle, that is to say that it is formed of one or more modules connected to each other, for the purpose of allowing a configuration which is perfectly suited to the needs of the user and which satisfies the requirements imposed by the specifications of the intended application.

Figure 2:
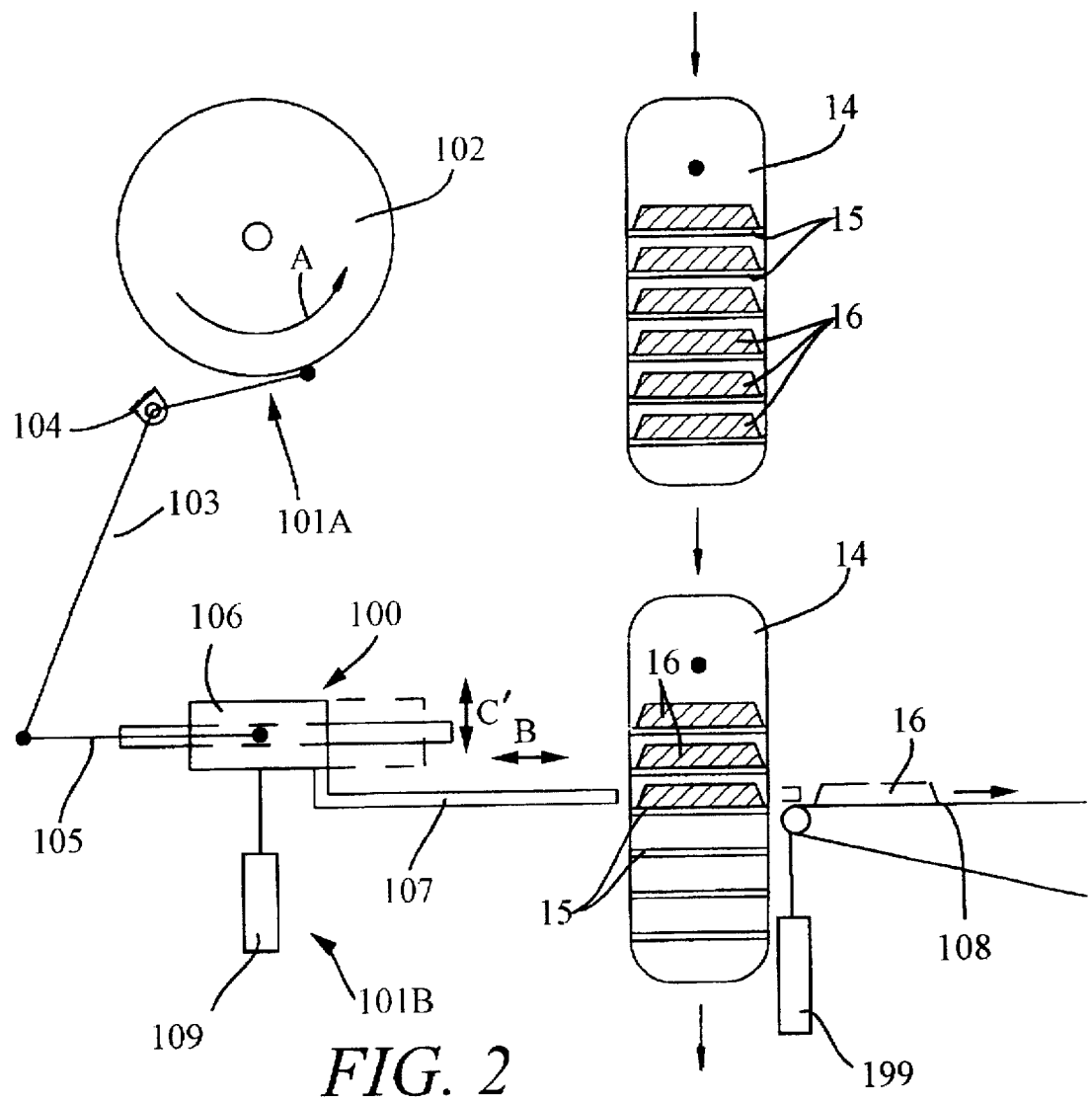
FIG. 2 is a schematic view illustrating the product receiving station equipment for an installation operating with a discontinuous movement.

A first embodiment of the receiving station equipment is shown in FIG. 2. This equipment consists of a pusher device 100, of a first driving mechanism 101A and, if required, a second driving mechanism 101B. This first driving mechanism comprises a cam 102 driven in the direction of arrow A by an electric motor (not shown) which controls a small cranked connecting rod 103 which is hinged on a fixed pivot 104. The free end of cranked connecting rod 103 is connected to a rod 105 attached to a slide 106 which carries a pusher 107 arranged for performing a substantially horizontal movement. A conveyor belt 108 is provided for clearing products 16 placed on shelves 15 of pendulant product carriers 14. For each cycle which corresponds to one revolution of cam 102, the cranked connecting rod pivots on pivot 104 and moves pusher 107, with the aid of the slide, in the direction of double arrow B. The pendulant products carriers are driven so as to present a product opposite pusher 107 at each cycle. The horizontal movement of this pusher moves a product 16 from a shelf 15 onto conveyor belt 108.

According to an alternative embodiment also shown in FIG. 2, the equipment may comprise a second driving mechanism 101B the function of which is no assure a substantially vertical movement (represented by double arrow C') of pusher 107. This vertical movement enables the movement of the pendulant product carriers to be followed, and possibly, the ejection of a product 16 to be carried out during a movement phase of the corresponding pendulant product carrier. This mechanism may comprise a double action type hydraulic jack 109 which assures the appropriate vertical positioning of pusher 107.

When this mechanism is installed, it is necessary also to provide for the vertical movement of conveyor belt 108 which receives products 16 when they are ejected from shelves 15. To this end, the head of conveyor belt 108 is associated with a hydraulic jack 199, which is also of the double action type, and which is controlled in sychronism with jack 109.

It is of course understood that the hydraulic jacks could also be replaced by screws driven in rotation by a motor or by any other known means having the same functions.

It will be noted that in this embodiment, pendulant product carriers 14 are stationary when the products are cleared.

Figure 3:
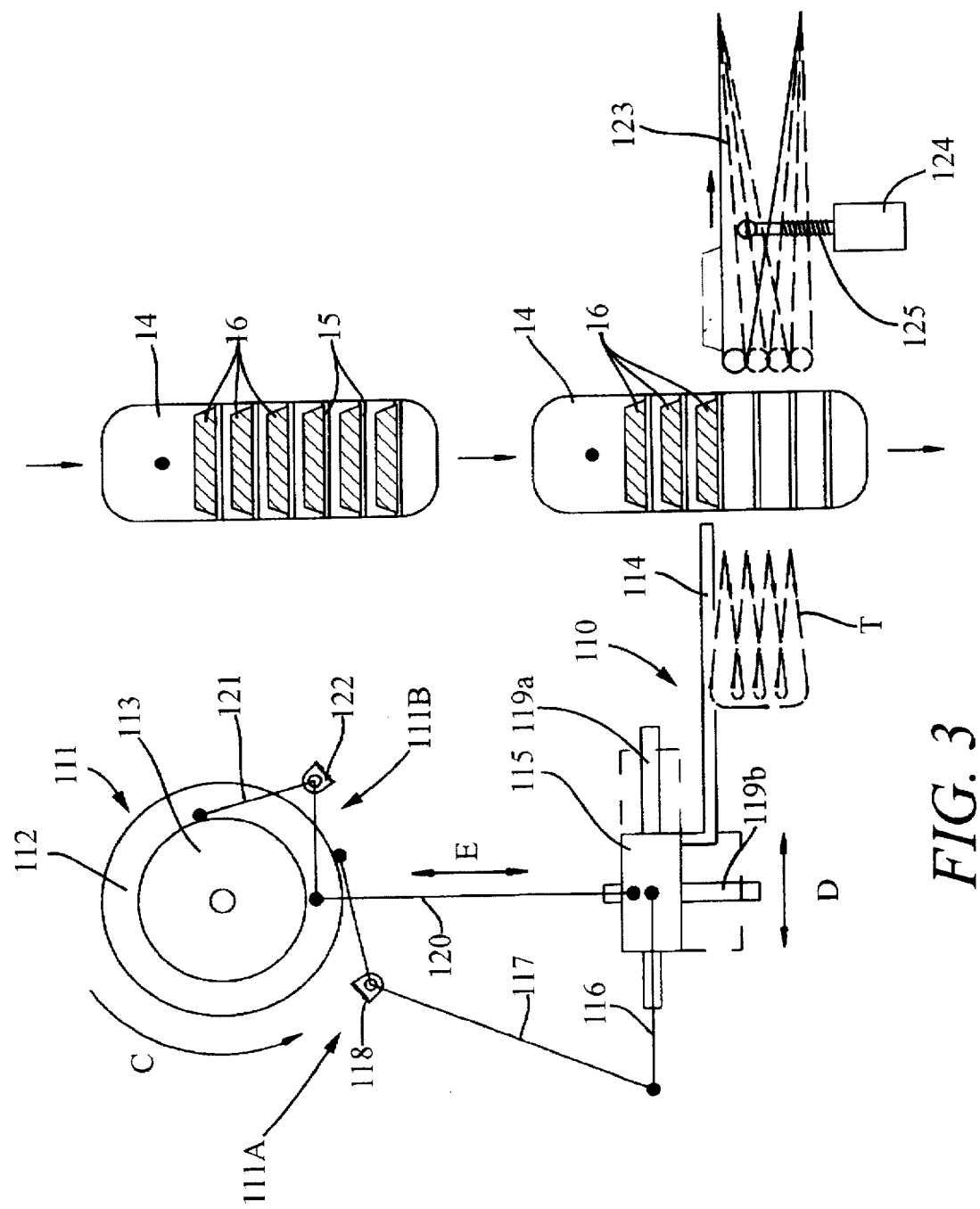
FIG. 3 shows the receiving station equipment for an installation operating with a continuous movement.

A second embodiment of the receiving station equipment is shown in FIG. 3. This equipment consists of a pusher device 110, a first driving mechanism 111A and a second driving mechanism 111B. These mechanisms comprise respectively a first cam 112 and a second cam 113 which are simultaneously driven in the direction of arrow C. First cam 112 controls the back and forward horizontal movement of a pusher 114, in the direction of double arrow D. To this end, the pusher is attached to a slide 115 which is attached to a rod 116 whose free end is coupled to one end of a cranked connecting rod 117, which is hinged on a fixed pivot 118, and whose other end is coupled to cam 112. This slide is arranged for moving horizontally on a first guiding member 119a. Second cam 113 controls the back and forward vertical movement of pusher 114, in the direction of double arrow E. To this end, slide 115 carrying pusher 114 and which is attached to a rod 120 of which one free end is coupled to an end of a small cranked connecting rod 121, which is hinged on a fixed pivot 122, is arranged for moving vertically on a second guiding member 119b. In this embodiment the pusher is subjected to a combined movement along a vertical direction which is controlled by a substantially similar mechanism to that constituting the receiving station equipment described with reference to FIG. 1, and by a complementary mechanism which induces the vertical movement.

Furthermore, the reception of products 16 placed on shelves 15 of pendulant product carriers 14 is assured by a conveyer belt 123 whose support is vertically movable. The control of the vertical movement of this support is achieved, in this case, by an electric meter 124 which controls a screw 125 one free end of which is attached to this support.

The object of this embodiment is to enable products to be cleared when the products are moving continuously, which involves a vertical movement of the pusher, and a vertical movement of the conveyer belt support.

It is obvious that the screw mechanism which assures the conveyor belt movement could be replaced by a control cam, and that the control cams which assure the pusher movements could be replaced by a screw mechanism.

The trajectory T followed by pusher 114 during a cycle is partially shown in the figure and corresponds to a closed loop. Different successive positions of belt 123 are also shown. Each time a pendulant produce carrier passes, the pusher and the belt are brought back to their initial position.

During the unloading of a pendulant product carrier, they partly follow its descending movement in order to position themselves opposite the products.

Figure 4:
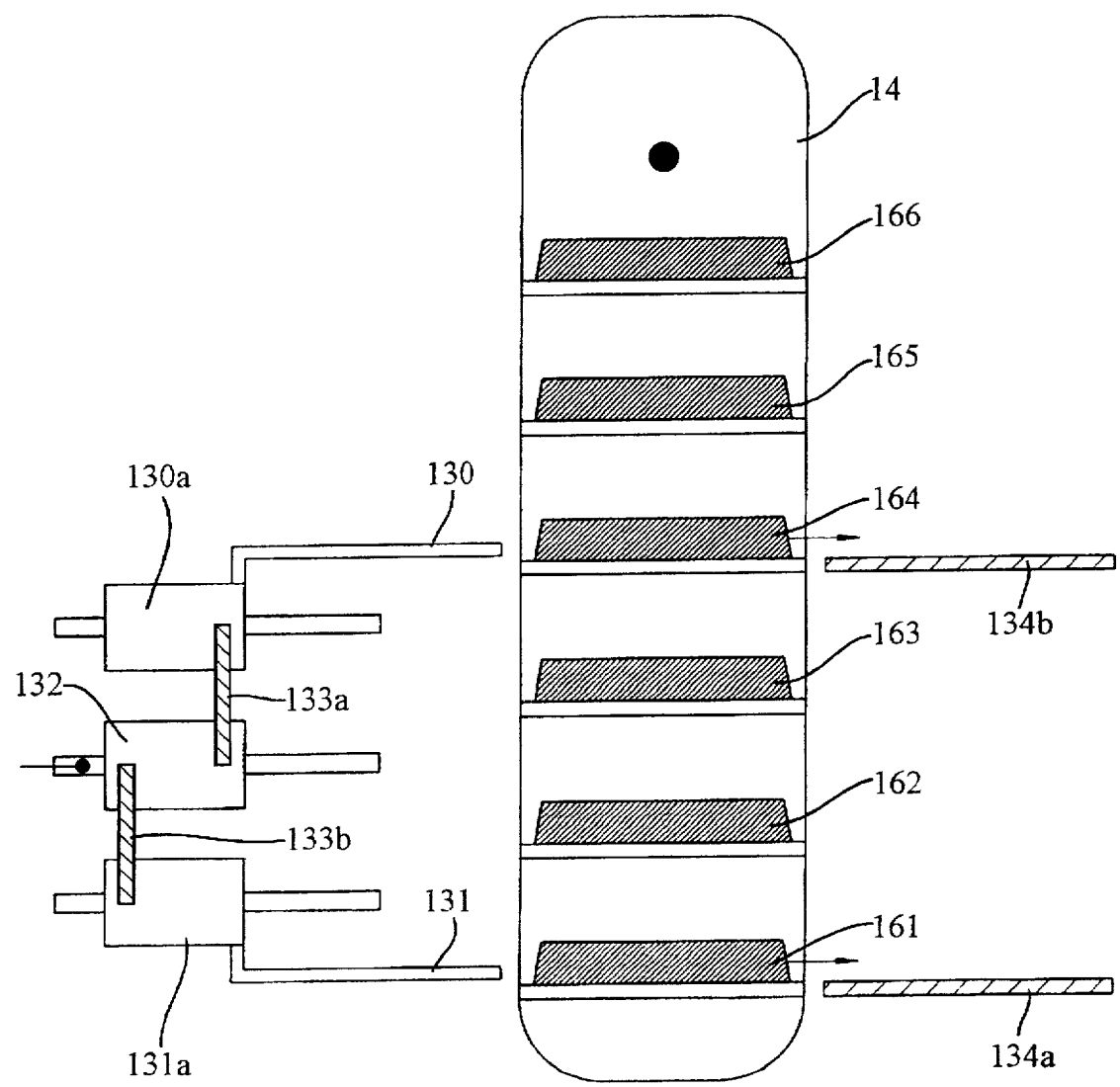
FIG. 4 shows an alternative embodiment of the receiving station equipment.

FIG. 4 shows an alternative embodiment of the receiving station equipment. In this case, the equipment is an improvement of the systems shown in FIGS. 2 and 3. The pusher device comprises two pushers 130 and 131 each coupled to a lateral actuator 130a and 131a. The lateral actuators are driven by a central actuator 132 thanks to two autonomous coupling keys 133a and 133b which assure a clutch function. This equipment further comprises two transversal conveyor belts 134a and 134b which are arranged for clearing the products towards two distinct packaging machines (not shown). in normal operating conditions, the two pushers 130 and 131 operate simultaneously pushing back pairs of products 161, 164, then 162, 165 and finally 163, 166. If for some reason or another, one of she packaging machines is temporarily not operating, the corresponding pusher may be stopped by uncoupling the corresponding key. All the products may then be cleared onto the same belt.

Since this two pusher device may be actuated independently, or in a combined manner, in may be associated with either of the vertical movement mechanisms described above. Further, the number of pushers is not limited and it would be possible to couple six pushers to a single actuator so as to eject systematically and simultaneously all the products of a same pendulant product carrier. In that case, it is of course necessary to assure that the products are cleared by appropriate means, that is to say, either ramps which feed all the products onto a single belt, or separate and independent belts.

We claim:

1. A pendulant product storage device for food products, comprising:

a pair of chains extending between a loading station and a receiving station and being moveable parallel to each other, each said chain forming a continuous loop which includes a feed section, in which said pair of chains are moveable from said loading station to said receiving station, and a return section, in which said pair of chains are moveable from said receiving station to said loading station;

a plurality of pendulant product carriers being horizontally suspended from said pair of chains;

a plurality of shelves, each said shelf being arranged horizontally on a corresponding one of said plurality of pendulant product carriers such that each said shelf is moveable, along with said pair of chains, between said loading station and said receiving station;

wherein said receiving station comprises:

a pusher device having a pusher which is horizontally and vertically moveable;

a first driving mechanism for moving said pusher horizontally, said first driving mechanism (101A) including a control cam (102) connected to said pusher (107) to perform said horizontal movement; and a second driving mechanism for moving said pusher vertically, said second driving mechanism (101B) including at least one of a hydraulic jack (109) and a screw, having axial movement, connected to said pusher to perform said vertical movement.

2. A pendulant product storage device according to claim 1, wherein said first driving mechanism (101A) comprises a first control cam (112) connected to said pusher (114) to perform said horizontal movement, and said second driving mechanism (111B) comprises a second control cam (113) connected to said pusher to perform said vertical movement.

3. A pendulant product storage device according to claim 2, wherein said pusher (114) is supported by a slide (115), and said slide is moveable horizontally on a first guiding member (119a) and moveable vertically on a second guiding member (119b).

4. A pendulant product storage device for food products, comprising:

a pair of chains extending between a loading station and a receiving station and being moveable parallel to each other, each said pair of chains forming a continuous loop which includes a feed section, in which said pair of chains are moveable from said loading station to said receiving station, and a return section, in which said pair of chains are moveable from said receiving station to said loading station;

a plurality of pendulant product carriers being horizontally suspended from said pair of chains;

a plurality of shelves, each said shelf being arranged horizontally on a corresponding one of said plurality of pendulant product carriers such that each said shelf is moveable, along with said pair of chains, between said loading station and said receiving station;

wherein said receiving station comprises:

a central actuator (132);

two lateral actuators (130a, 131a);

a pusher (130, 131) is associated with each one of said two lateral actuators, each said pusher is moved in a lateral direction, upon actuation of the respective lateral actuator, for clearing product placed on said plurality of shelves; and an autonomous coupling key (133a, 133b) coupling each of said two lateral actuators to said central actuator such that said two lateral actuators are at least one of independently and simultaneously actuatable.

5. A pendulant product storage device according to claim 4, wherein said pusher is arranged for clearing product placed on separate shelves carried by said pendulant product carriers.

6. A pendulant product storage device according to claim 4, wherein said receiving station comprises at least two transversal conveyor belts (134a, 134b) arranged for simultaneously clearing product carried by said pendulant product carriers.

* * * * *